2,899,313
PROCESS FOR PREPARING A SOLID FLAVORING COMPOSITION

Benjamin Makower, Berkeley, and Thomas H. Schultz, Lafayette, Calif., assignors to the United States of America as represented by the Secretary of Agriculture No Drawing. Application January 26, 1954
Serial No. 406,368

2 Claims. (Cl. 99—140)

(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to and has among its objects the provision of novel flavoring compositions and methods for preparing them. A particular object of the invention concerns the preparation of solid flavoring compositions which serve as a convenient source of flavor and which may be stored for long periods of time without loss or deterioration of the flavoring component. These and further objects and advantages are explained in more detail hereinafter.

It is well known in the food industry that the characteristic flavoring agents of various fruits may be isolated in concentrated form as oils or essences. For example, methods of obtaining orange oil, lemon oil, apple essence, pineapple essence and so on have been developed. These volatile flavoring agents are useful in many instances for supplementing the flavor of various food products. However, these liquid preparations are not particularly suitable for incorporation with solid food products, dehydrated fruit juices, for example, nor are they completely stable in the liquid form. Thus on storage losses occur due to vaporization and/or chemical alteration, such as oxidation, of the flavoring agents. By proceeding in accordance with this invention the liquid flavoring agents are made up into solid form so that they are suitable for enhancing the flavor of many different types of foodstuffs, particularly in connection with dehydrated fruit juices. The solid compositions in accordance with this invention have the advantage that the volatile flavoring agent is stabilized and trapped in the solid compositions so that even on prolonged storage, the flavoring agent is not lost by vaporization nor does it undergo deterioration. A further advantage of the products of this invention is that, when they are contacted with water, as in utilizing them for ultimate consumption, the flavoring agent is released as minute globules dispersed throughout the liquid preparation. Thus, for instance, when dehydrated orange juice fortified with the product of this invention is reconstituted by addition of water, the flavoring agent (orange oil) is present in the reconstituted juice as minute globules suspended in and dispersed throughout the body of juice. Thus the resulting juice has a natural appearance and a uniform flavor.

The compositions in accordance with this invention comprise a matrix of a sugar in an amorphous state and in which matrix are uniformly dispersed minute globules of a volatile flavoring agent. Briefly described, the compositions are prepared by melting a sugar, or mixture of sugars, then incorporating therein the flavoring agent with vigorous agitation and allowing the resulting mass to cool and harden. Preferably the temperature of the molten mass is reduced prior to incorporation of the flavor to minimize vaporization of the flavor.

It is to be emphasized that the amorphous nature of the composition is an important factor of the invention. This fact can be explained as follows:

If the molten mass of sugar and flavoring agent were to solidify by crystallization, the flavoring agent would not be stabilized nor be held securely by the crystal mass. Thus, because of the manner in which sugars crystallize, the solid would be a mass of sugar crystals with the flavoring agent existing mainly in channels or interstices in the crystalline mass. Many of these channels would extend to the surface of the mass and these channels would provide the avenues by which the flavoring agent could vaporize from the composition and contact the atmosphere whereby to cause deterioration of the flavor. As a result, with a composition of crystalline nature, the flavoring agent would not be protected from vaporization nor from deterioration.

When proceeding in accordance with this invention the flavoring agent is uniformly incorporated in the molten mass of sugar. At this point one has a liquid mass comprising mostly of sugar with the flavoring agent dispersed uniformly throughout the body of the liquid sugar as minute globules. The mass is an emulsion of the droplets or globules of flavoring agent in the molten sugar. When this mass is cooled the same relationship is maintained, the cooled product being a mass of solid amorphous sugar with minute globules of the flavoring agent uniformly dispersed throughout the sugar. This material is thus still an emulsion, though in the solid state. It is to be noted that this solidification is caused not by crystallization but simply by such a large increase in viscosity that the material will retain its shape. The solidification which occurs is analogous to the setting of molten glass in which case cooling of the melt results in such a great increase in viscosity that the material is termed a solid. The product of this invention in the amorphous state has very desirable properties as to stabilizing the flavoring agent against vaporization and deterioration. Because the flavoring agent exists in the amorphous mass as minute globules, the flavoring agent is so protected from contact with the atmosphere that vaporization and deterioration cannot take place. In the products of this invention there are no channels as in a crystalline product and hence no avenues are provided for escape of the flavoring agent or contact thereof with the atmosphere. An additional advantage of the globular, dispersed nature of the flavoring agent in the amorphous sugar is that when the composition is contacted with water as in preparation for ultimate use, the flavoring agent is dispersed through the liquid mass as minute globules suspended in the liquid. This means that the reconstituted juice or other liquid product has a natural appearance and a uniform flavor in all its parts.

In preparing the flavoring compositions of this invention, various sugars may be used as for example, sucrose, dextrose, maltose, levulose, lactose, mannose, galactose, etc. Preferably a mixture of sugars is used to ensure the formation of an amorphous mass when the molten, sugar-flavoring agent emulsion is cooled. For example, if sucrose is selected as the base sugar one may incorporate with it a quantity, for example, of from 10–50% of a different sugar such as dextrose, corn syrup, corn syrup solids, maltose, fructose, lactose, mannose, galactose, etc. Usually for practical purposes it is preferred to add about 33% of invert sugar or corn syrup. The use of a mixture of sugars rather than a single sugar has another advantage in that the mixtures will melt at a lower temperature than the individual sugars. The presence of a lower melting point is desirable in that the flavoring agent can be incorporated with the molten sugar at a lower temperature without danger of crystallization while stirring in the flavoring agent. Further, incorporation of the flavoring agent into the sugar at a lower temperature minimizes vaporization and/or deterioration of the flavoring agent.

As pointed out above, to lower the melting point of the sugar and to ensure formation of an amorphous state, it is preferred to add a different sugar to the sugar chosen as the base. However other agents can be added to the individual sugar or mixture of sugars to lower the melting point and/or ensure formation and maintenance of the amorphous solid state. Such agents are for example, sorbitol, propylene glycol, glycerol, sodium gluconate, alpha-methyl glucoside, dextrin, delta-gluconolacetone, or other non-toxic aliphatic polyhydroxy compound. The proportion of agent to be added may be from about 1 to about 20%, depending on the efficacy of the particular agent selected and the melting point desired. In the case of liquid additives such as propylene glycol, glycerol, etc., these should not be used in such high proportions as to cause the final product to be tacky. The proper amount to use in any particular case can be easily determined by conducting a few pilot trials with various proportions of the agent in question.

In many cases, it is desirable to add a small proportion of water, on the order of 1 to 10%, to the sugar or mixture of sugars. The addition of water provides several advantages, as follows: The melting point of the sugar or sugar mixture is decreased whereby the flavoring agent can be incorporated in the molten sugar at a lower temperature whereby vaporization and/or deterioration of the flavoring agent is minimized. In addition, lowering the melting point of the sugar or sugars decreases possibility of charring or other deterioration of the sugar during the melting operation. A further point is that addition of water decreases the viscosity of the melt so that incorporation of the flavoring agent may be accomplished more efficiently. Where water is utilized as a melting point and viscosity depressant, it is convenient to first dissolve the sugar components in sufficient water to form a solution and then boil the resulting solution until it reaches a solids content high enough that on cooling to room temperature it will form a hard glassy mass.

Although the presence of water is desirable in the melt, its presence in the final product is undesired as it may promote crystallization of the amorphous sugar on storage. For this reason it is preferred to remove moisture from the final product by vacuum evaporation so as to stabilize the amorphous nature of the product.

As noted briefly above, it is preferred to cool the molten sugar before incorporating the flavoring agent thus to minimize evaporation and/or decomposition of the flavoring agent. Usually the mass is cooled to about 100–115° C. or lower if the mass will remain fluid enough so that the flavoring agent can be stirred in. The incorporation of a low-molecular weight melting-point depressant such as water, glycerol, or propylene glycol helps in this regard in that such melts can be cooled to lower temperatures and still have such low viscosity that the flavoring agent can be effectively incorporated therein. For best results the flavoring agent should be incorporated in the melt without at the same time beating air into the mixture. Whenever necessary, additional protection from vaporization of the flavoring agent or damage from air contact with air can be secured by introducing the flavoring agent through a tube under the surface of the melt, by blanketing the melt during the flavor-incorporation step with nitrogen or other inert gas, or by conducting the mixing in a closed system.

After the flavoring agent has been incorporated into the molten sugar the resulting mixture is cooled, preferably in a place having a dry atmosphere to prevent crystallization and/or development of tackiness. Preferably, the molten mass is cooled rapidly, as by pouring it in a thin layer on a cold metal plate, to ensure formation of an amorphous product. Rapid cooling is desirable in that the molten mass is "frozen" in the same state in which it existed prior to cooling and the flavoring agent remains in the form of minute globules dispersed throughout the mass. Rapid cooling thus prevents crystallization and formation of channels filled with flavoring agent. Also it is preferred that the sugar-flavoring agent composition be free of sugar crystals. These crystals may act as nuclei which initiate undesired crystallization. A simple technique to prevent this is to melt the sugar in one vessel then pour it into another vessel for subsequent operations. In such operations the remaining unmelted crystals will remain stuck to the sides of the first vessel and will not contaminate the melt.

The cooled amorphous mass is then crushed or ground to a granular state so that it will be in suitable condition for incorporation in dried fruit juice powder or other food preparation. For most purposes, a granular product of about 10 to 20 mesh is preferred because it is readily soluble. Moreover, crushing to such a particle size will not expose too great a quantity of the flavoring agent to the surface of the particles.

Preferably, the ground product is subjected to a vacuum treatment prior to incorporation in food products. This treatment will remove, by vaporization, the small portion of flavoring agent which is not entrapped in the amorphous mass but which is on the surface of the mass and hence would be subject to deterioration if not removed. The vacuum treatment is also desirable as it will remove moisture from the product. Since moisture in the product may promote crystallization of the mass on storage, removal thereof is desirable. The vacuum treatment of the final product simply involves placing the composition in a sealed vessel which can be exhausted to a low pressure. The vacuum treatment is usually continued for several hours to ensure removal of all surface flavoring agent and water. In conducting the vacuum evaporation, the portion of flavoring agent which is vaporized can be recovered by the use of Dry Ice traps or other suitable condensing system.

If desired, the ground product may be coated with flour, powdered sugar, starch, or the like to prevent cohesion or fusion of the particles if the product is subjected to elevated temperatures on storage.

The proportion of flavoring agent to be incorporated in the molten sugar may be varied depending on the flavor strength desired for the final product. Usually enough of the flavoring agent is added to furnish about 5 to 20% thereof. Many different flavoring agents may be employed as for example orange oil, lemon oil, grapefruit oil, lime oil, clove oil, peppermint oil, bay oil, or cedarwood oil, or the essences of apple, pear, pineapple, grape, peach, apricot, strawberry, raspberry, cherry, prune, or plum. In the case of fruit essences, it is preferable to first purify them to remove water and low-molecular weight alcohols by the process described in the patent application of K. P. Dimick and B. Makower, Serial No. 368,016, filed July 14, 1953. It is also preferred to add an edible oil and/or an edible emulsifying agent to the purified fruit essence so that it will emulsify properly with the molten sugar.

The invention is further demonstrated by the following examples.

*Example I*

A mixture of 90 g. dextrose and 10 g. levulose was heated to 160° C. The melt was then rapidly cooled to 108° C. and 5 ml. of orange oil was incorporated therein with vigorous agitation. The melt, now at 95° C., was poured on a plate which was then placed in a desiccator to cool. After cooling to room temperature the hardened material was scraped off the plate and ground and screened. The 10 to 20 mesh fraction was then subjected to vacuum to remove orange oil which was on the surface of the particles rather than trapped in the particles.

On analysis of the product it was found to contain 3.6% of orange oil. A sample of the product was subjected to high vacuum (0.1 to 0.2 mm. Hg) at 45° C. overnight then analyzed for its orange oil content which was found to be 3.4%. This negligible loss of orange oil indicated that the oil was securely trapped in the solid emulsion and protected from evaporation.

*Example II*

A mixture of 100 g. sucrose, 50 g. of corn syrup (approx. 60% dextrose equivalent), and 26 g. of water was boiled until a boiling point of 155° C. was attained. The hot mass was cooled to 110° C. and 5 g. of orange oil was incorporated therein with vigorous agitation. The mixture was poured on a flat surface, allowed to cool in a dry atmosphere, and then was ground and screened. The 10–20 mesh fraction was subjected to vacuum to remove surface oil and moisture, resulting in a product which on storage exhibited no loss of orange oil or change in the flavor of the oil.

*Example III*

A quantity of fresh orange juice was concentrated under vacuum to produce a 7-fold concentrate. This concentrate was then reduced to dryness by subjecting the concentrate in thin layers to heat and vacuum in a vacuum dehydrator. The dehydrated orange juice was broken up into flakes and mixed with sufficient of the product of Example I to furnish about 0.08% of orange oil in the composite product. This product was reconstituted with water and found to have a taste almost undistinguishable from that of fresh orange juice. Even after storage of the product for several months it was found to form a juice of natural taste and odor. Further, on reconstitution it was found that the orange oil was present in the reconstituted juice as minute globules suspended in and dispersed throughout the whole body of juice.

*Example IV*

This example demonstrates the advantages of an amorphous product over a crystalline one.

Three hundred grams of anhydrous dextrose was heated to 155° C. The melt was cooled to 110° C. and then 18 ml. of orange oil incorporated therein with vigorous stirring. The resulting mixture was divided into two parts, each part being treated separately as follows:

A. (*In accordance with this invention*).—The molten mass was poured onto stainless steel plates and cooled in a vessel having a dry atmosphere (a laboratory desiccator).

B. (*Not in accordance with this invention*).—To the other half of the product was added about 0.4% of dextrose crystals and the mixture poured on stainless steel plates and allowed to cool in a humid atmosphere (65% relative humidity).

The two products after cooling were ground and subjected to vacuum to remove surface orange oil. It was observed that product A was glassy and amorphous whereas product B was crystalline. The orange oil contents of the products were determined and re-determined after subjecting the products to vacuum at 45° C. for 21 hours. The results obtained are set forth below:

| Product | State | Original orange oil content, percent | Orange oil content after subjecting to vacuum at 45° C. for 21 hours, percent |
|---|---|---|---|
| A | amorphous | 4.1 | 3.9 |
| B | crystalline | 3.8 | 1.4 |

Having thus described the invention, we claim:

1. A process for preparing a solid flavoring composition in which the flavoring component is protected from vaporization and deterioration which comprises forming a hot melt containing principally at least one sugar, incorporating therein a volatile, liquid flavoring agent, cooling the resulting mass under conditions which favor the formation of an amorphous solid, grinding the cooled mass, and then subjecting it to a vacuum to remove moisture where present and the portion of flavoring agent on the surface of the ground particles.

2. A process for preparing a solid flavoring composition in the flavoring component is protected from vaporization and deterioration which comprises heating a mixture consisting principally of at least two different sugars to form a molten mass, cooling the melt to a temperature below its melting point but not low enough to solidify it, incorporating therein a volatile, liquid flavoring agent, allowing the resulting mass to cool and solidify under conditions which favor formation of an amorphous solid, grinding the cooled product, and then subjecting it to vacuum to remove moisture where present and the portion of flavoring agent on the surface of the ground particles.

References Cited in the file of this patent

UNITED STATES PATENTS

| 1,512,730 | Washington | Oct. 21, 1924 |
| 2,311,235 | Kuderman | Feb. 16, 1943 |
| 2,566,410 | Griffin | Sept. 4, 1951 |